US008255479B2

(12) United States Patent
Killmer

(10) Patent No.: US 8,255,479 B2
(45) Date of Patent: Aug. 28, 2012

(54) ONLINE NETWORK AND ASSOCIATED METHODS

(75) Inventor: Mark Killmer, Victoria (AU)

(73) Assignees: Qtrax, Inc, New York, NY (US); Law Office of Scott C Harris, Inc, Rancho Santa Fe, CA (US)

( * ) Notice: Subject to any disclaimer, the term of this patent is extended or adjusted under 35 U.S.C. 154(b) by 1207 days.

(21) Appl. No.: 09/921,003

(22) Filed: Aug. 1, 2001

(65) Prior Publication Data

US 2002/0046257 A1   Apr. 18, 2002

(30) Foreign Application Priority Data

Aug. 3, 2000 (AU) ........................ PQ9156

(51) Int. Cl.
G06F 15/16 (2006.01)
(52) U.S. Cl. ......... 709/217; 709/218; 709/219; 709/227
(58) Field of Classification Search ............. 709/217, 709/218, 219, 227; 705/1
See application file for complete search history.

(56) References Cited

U.S. PATENT DOCUMENTS

| 5,598,557 | A | 1/1997 | Doner et al. | |
|---|---|---|---|---|
| 5,933,827 | A | 8/1999 | Cole et al. | |
| 5,960,411 | A | 9/1999 | Hartman et al. | |
| 6,493,702 | B1 * | 12/2002 | Adar et al. | 707/706 |
| 6,721,713 | B1 * | 4/2004 | Guheen et al. | 705/1 |
| 6,983,320 | B1 * | 1/2006 | Thomas et al. | 709/224 |
| 7,031,961 | B2 * | 4/2006 | Pitkow et al. | 1/1 |
| 7,107,226 | B1 * | 9/2006 | Cassidy et al. | 705/26 |
| 7,577,582 | B1 * | 8/2009 | Ojha et al. | 705/26.3 |
| 2004/0064351 | A1 * | 4/2004 | Mikurak | 705/7 |
| 2004/0143600 | A1 * | 7/2004 | Musgrove et al. | 707/104.1 |
| 2006/0206393 | A1 * | 9/2006 | Brown et al. | 705/26 |
| 2010/0122178 | A1 * | 5/2010 | Konig et al. | 715/738 |

FOREIGN PATENT DOCUMENTS

| GS | 2336699 A | 10/1999 |
|---|---|---|
| WO | WO 98/59506 | 12/1998 |
| WO | WO 99/64965 | 12/1999 |
| WO | WO 00/41090 | 7/2000 |

OTHER PUBLICATIONS

PCT/US01/24511 European Search Report issued Dec. 12, 2003.

* cited by examiner

Primary Examiner — Thu Nguyen
Assistant Examiner — Angela Widhalm
(74) Attorney, Agent, or Firm — Law Office of Scott C. Harris, Inc.

(57) ABSTRACT

Computer program products, computer systems and related methods are provided which compare a URL, title and/or content of an online site viewed by a user with a first index of keywords relating to a plurality of subject matter categories, to determine any subject matter categories to which the online site relates; cross-reference any determined subject matter categories with a second index of alternative online sites categorised by subject matter, in order to determine any alternative online sites in the same or similar category; and perform a variety of actions in response including displaying a determined alternative online site to the user.

18 Claims, No Drawings

ONLINE NETWORK AND ASSOCIATED METHODS

FIELD OF THE INVENTION

The present invention relates to online networks and mechanisms for facilitating communication, trade, marketing, promotion, advertising, multi-lingual use and interoperation thereon and between.

BACKGROUND ART

Online networks, such as the Internet, are increasingly being used for business purposes. In this regard, many enterprises have created "online" businesses by establishing web sites for marketing and other commercial purposes. These businesses derive revenues by advertising and selling their products and services via the Internet as well as by selling advertising space on their sites.

Promotion

In order to generate a successful, commercially focussed web site, it is necessary to generate a large number of visitors to a web site, which initially requires advertising and promoting the existence of the web site. This can be an expensive and lengthy process.

There is therefore a need for a mechanism by which traders are able to set up a web site and have access to advertising resources, such as targeted advertising mechanisms.

There is also a need for an improved mechanism to make Internet users aware of particular products and services being offered for sale over the Internet.

Consumer Purchasing Details

Once a trader has set up an appropriate web site from which to trade, it is also necessary for the trader to have a secure mechanism when dealing with customers. In this regard, some traders require a customer to provide their credit and address details, and their details are then saved on the trader's database, so that they may readily be accessed in future transactions. Many customers do not like the idea of having their private details stored on a trader's database for fear of these details being misused. For example, the details may accidentally be made public, or a hacker may forcedly gain access to the details, or the trader may decide to use the details for their own purposes, such as establishing a list of consumers for marketing purposes.

There is therefore a need to provide an improved mechanism for dealing with customers' private details.

There is also a need for an improved method of conducting transactions in an online environment.

Access to Email Accounts

A further problem that has been created with the advent of the Internet is that many individuals and businesses are setting up one or more email accounts with various Internet service providers. To access these accounts, it is generally necessary for the user to manually configure and dial up their account to see if they have any email messages. This can be a time consuming procedure. In addition, if the user has multiple email addresses the procedure becomes even more time consuming. The greater the number of email accounts held by a particular user, the greater the inconvenience to check their status regularly, so that the potential for missing important email communications also increases.

This problem is particularly relevant if a person is away from their normal base, such as whilst travelling, whilst seconded to a client or if the person is associated with a business that has multiple offices. For example, whilst a person is at work it is generally difficult to access a home email account, and vice versa.

There is therefore a need for an improved email system and/or method.

Language of the Internet

The Internet has evolved from an English language base and is thus skewed towards English language speakers. The preference towards the English language is evident in the greater proportion of English language sites, Internet searching facilities, domain names, URLs (universal resource locators).

Therefore, although monitors and software support non-Roman characters, these characters can not be displayed in the URL address bar of Internet browsers, hence users are unable to see non-Roman characters in the URL address bar. Accordingly, the user must know a Roman character version of the domain name.

This creates a barrier to the multitude of Internet users and potential Internet users that may have weak or no English language skills. The language barrier also makes it increasingly difficult for non-English based traders to be found on the Internet as their domain names can only be composed of Roman characters (ie abcdefg etc) and/or Arabic numerals (ie 12345 etc).

For example, Chinese characters cannot be input into an Internet browser URL address bar. Therefore, presently Chinese traders creating a presence on the Internet must obtain a domain name in a Roman phonetic version of their Chinese trading name, such as www.chinesetrader.com.cn. More importantly, this Roman version must be promoted as such and hopefully remembered by the target market.

There is therefore a need for an improved URL addressing method and/or system.

Wireless Communications and Data Access

In recent years, the online environment has broadened its reach to the world of wireless communications and significant miniaturization has occurred. This is exemplified by the increased promotion and use of WAP (wireless application protocol) enabled communication networks and devices, such as mobile telephony networks, mobile/cell phones and PDAs (personal digital assistants).

This has resulted in both product and network suppliers focussing their attention on converging data and communication applications into single devices and creating the necessary infrastructure to enable users to access data "anywhere, anytime".

This evolution has created the need for innovative applications that are capable of compiling, generating and distributing relevant data and services to the user of wireless communications.

SUMMARY OF THE INVENTION

According to one aspect, the present invention provides a computer program product including means for comparing a URL, title and/or content of an online site viewed by a user with a first index of keywords relating to a plurality of subject matter categories, to determine any subject matter category(s) to which the online site relates; means for cross-referencing any determined subject matter category(s) with a second index of alternative online sites categorized by subject matter, in order to determine any alternative online sites in the same or similar category; and means for displaying information relating to any determined alternative online sites to the user.

According to another aspect, the present invention provides a method of comparative advertising in an online environment including the steps of analysing an online site viewed by a user to identify subject matter to which the online site relates, and displaying to the user information relating to alternative online sites with the same or similar subject matter.

According to a further aspect, the present invention provides a method of comparative advertising in an online environment including the steps of analysing an online site viewed by a user to identify products advertised on the site and displaying to the user information relating to competing products on alternative online sites.

According to a still further aspect, the present invention provides a method of conducting a commercial transaction in an online environment including the steps of extracting a user's personal, credit and/or delivery details from a storage means on the user's online device and sending these details to the merchant automatically when the user initiates a purchase request.

According to a still further aspect, the present invention provides a method of transmogrifying at least a portion of content contained on a page of an originating site to a beneficiary site, including the steps of storing the originating site address, start and end point markers and a specific address point assigned to a particular cell which refers to the content to be transmogrified; opening the originating site; assigning the stored address points to the relevant sections of the originating site page; scanning the page for the specific address point; scanning the page from the specific address point to locate the start and end points; and copying the content between the start and end points into a file for transferal to the beneficiary site.

According to a still further aspect, the present invention provides a computer program product usable with an Internet browser for locating an online site when non-US ASCII characters are input into the browser, the computer program product including monitoring means for intercepting a message relating to a non-compliant term, such that the non-compliant term includes non-US ASCII characters; processing means for analysing the intercepted message to ascertain a string identifying the non-compliant term; search means for querying a database of strings relating to non-compliant terms and associated online sites, to find a match for the string identifying the non-compliant term; and if a match is found, directing the user to the matched online site.

DETAILED DESCRIPTION

1. On-Line Usage Measurement

According to a first invention, there is provided a mechanism for monitoring one or more user's general usage of web sites, with a view to providing "advice" to the user about their usage.

In one embodiment, the invention is embodied in a software program that the user will be required to load onto their network-connected device, such as a PC so that their activity may be monitored. As an example, the program could identify the type or subject matter of a website the user is viewing based on broad product and/or service categories, such as computers, books, software, travel, etc. When the software identifies the type of site the user is viewing (e.g. a travel site) it is capable of alerting the user of an alternative site/s, which fall within that category or a similar category.

This is achieved by the software analysing the URL, the title of the web page and/or the content of the page. The software is able to determine the category of product or service by using broad rules of thumb and reference to a database containing an index of URLs and key words. This database may be located within the software or on a remote server or any other suitable location. Once the category is determined the software queries the same or another database to produce an appropriate list of alternative sites and or data which match that category. One or more of these alternative sites and or data may then be displayed to the user in a separate window on the user's monitor. The list of sites and or data presented to the user may also contain hyperlinks to the alternative sites to facilitate easy navigation to those sites.

In another embodiment of this invention, there is provided the ability to direct a customer to alternative web sites within the customer's geographic proximity. For example, if the customer was based in Melbourne Australia and/or entered a web site address that related to an Australian trader, then the user could be alerted to alternative trader/s based in Melbourne, Australia or near thereto.

This invention may be used as a marketing tool, so that users of the Internet are directed to particular trader' sites who commission the software. The invention has the advantage of providing relevant alternatives to the current web page that a user is viewing hence empowering them to make more informed decisions and potentially leaving no stone unturned. Commercially, the software could be applied, but not limited to, the following applications:

the provision of advertising;
the promotion of search engines;
the marketing of a network of associated web sites/online traders; and
price and product comparison (see below for more details).

In another embodiment of the invention, the software is able to recognise when the user will potentially purchase products or services from the web site they are currently viewing, by recognising the point at which the user accesses detailed information about a "competing product". A competing product is one offered by both the trader operating the site that the user is currently viewing and an alternative trader associated with the software (for example, by being part of a network of "associated" traders or via a license agreement, etc). This "recognition" is achieved by analysing the current web page to find references to particular product/s. The software then cross references the analysis to a database with appropriate terms to identify "competing products" in order to determine whether a "competing product" is on offer.

Once it is determined that a competing product is on offer, the software then displays to the user, in a separate window on the user's computer monitor, information regarding the competing product and the alternative trader. The information presented to the user may include, but is not limited to:

a hyperlink to the alternative trader;
a hyperlink to a specific page of the alternative trader's web site that specifically relates to the competing product;
the price of the competing product; and
the ability to place an order/buy the competing product from this point of access.

This embodiment of the invention is therefore useful for the customer, who is kept informed of where to buy competing products, and also for the trader, for whom this tool is a useful advertising mechanism.

It is to be appreciated that this invention need not be established only when a user registers as a customer of a particular web site, but may be instituted at any point in time. For example, this service may be offered to any Internet user on the basis that it will assist them in finding competing products for sale on a multitude of web sites across the network.

Also, the pricing lookup tables are preferably updated from time to time, to ensure that the prices indicated are a true reflection of the offered price.

In another embodiment of this invention, a form of reverse auctioning is applied. In this regard, if the customer was about to buy a particular product, and an alternative trader did not offer that product at a lower price, the alternative trader could nevertheless be notified of the possible transaction and have it determined whether or not the trader was prepared to reduce their price in a bid to secure the purchase. In this regard, a second lookup table could be provided, with the alternative trader's "best price possible" listed. This second lookup table would be accessed if it were found that the trader's standard price was not cheaper than the current trader's price. This best price possible could then be offered instead, or an amount somewhere between the external trader's price and this best possible price using an appropriate algorithm.

This embodiment of the invention provides the customer with an enhanced user interface, in that they are directed to sites of use to them and hence potentially save the customer a significant amount of time. It is also advantageous for the trader, as they receive targeted customers at their site.

2. "Universal Shopping Cart"

According to a second invention, there is provided a mechanism for automatically trading over an online network such as the Internet without the need to continually register credit and personal details with traders each time a user registers with a different trader or acquires a product. In this invention, a user can register with a trader, or network of traders, in order to initiate the ability to make transactions on the traders' sites. This registration process preferably involves the customer entering their personal, credit and/or delivery address details when they install the software that enables interaction with the site(s) on their computer. These personal details, however, are not saved in the trader's own customer database, but are instead saved in the memory of the customer's own computer in a securely encrypted format, where they are not accessible to the trader. When the customer decides to purchase a particular product, they send a purchase request to the trader.

This purchase request may be created by any means, although preferably by the customer entering a code that designates the product and pressing a password protected "Buy Me" button. The code, for example, may be a stock code indicated in advertising catalogues. When the customer presses the "Buy Me" button, the personal, credit and/or delivery details that are saved in the memory of the customer's computer/online device are also sent to the trader together with the purchase request, in an industry standard encrypted secure form. The trader will then process the transaction based upon this information.

Under this approach the trader obtains the information necessary for processing a transaction, and the customer has the peace of mind that their details are not being stored on a remote database. In addition, the customer is able to enjoy the ability of purchasing products without having to enter personal, credit and/or delivery details for each transaction, as the id transfer of the details is coordinated by the purchasing program.

A further advantage of this approach is that the customer is able to use the one registration process to trade with multiple traders. Hence another embodiment of this invention is to apply the purchasing mechanism to a network of web sites/traders. In this embodiment of the invention, the purchaser need only register their details once, then all other sites in or associated with the network that also utilise the purchasing mechanism of the present invention are able to receive the customer's details from the saved location on the customer's computer at the customer's discretion. Therefore, due to the common purchasing technique, the customer also need not learn various different procedures for purchasing goods.

3. Message Retriever

A third invention provided by the present application is that of remote message retrieval/transmission. This invention allows users to retrieve, send, collate and save messages, such as, but not limited to email, SMS, voice mail and faxes via the Internet using a web browser.

In the case of emails, rather than directly dialing up their one or more email accounts and using an email program (such as MS Outlook) to read the emails, the "Message Retriever" software is able to collect and display the user's emails on any online network connected device. The software is capable of retrieving emails from a number of email accounts from a number of email hosts. Additionally, the present invention can be configured to retrieve messages from all of the user's accounts or selected accounts.

To implement the present invention, a user enters their email address (e.g. joblow@domainnamesltd.com) and preferably a password associated with that email account, on a secure "Message Retriever" web site in order to achieve retrieval. This process is akin to a registration process. The advantage of this simple registration process is that the user need not know or enter any technical details associated with their email account, such as mail server names and IP addresses.

The "Message Retriever" software analyses the user's email address and can either query a database or will dynamically determine the POP3 server details associated with the email address by an algorithmic process, preferably in the following sequence:

First, the email hostname (e.g. domainnamesltd.com) is sequentially altered to all of the common POP3 (Post Office Protocol) formats (e.g. mail.domainnamesltd.com, pop.domainnamesltd.com, etc). With each alteration the "Message Retriever" software attempts communication with the potential POP3 server. If successful communication is achieved then the POP3 mail server address is stored in the database and the software will proceed to retrieve and/or send any messages.

Secondly, if the first method fails, then the software performs an "MX Lookup" that retrieves the automated mail host IP response relating to the user's email hostname. If successful communication is achieved then the POP3 mail server address is stored in the database and the software will proceed to retrieve and/or send any messages.

Thirdly, failing methods one and two, the software starts an upwards and downwards "IP scan" of IP addresses related to the user's email hostname, by way of reverse 'DNS' lookup. This scan searches for the POP3 host by incrementing and/or decrementing the user's email hostname IP address until it locates the POP3 host.

Finally, if all these steps are unsuccessful, the user's email hostname is stored in a database for manual POP3 server determination.

Upon determination of the POP3 server the software is able to query the remote POP3 server by standard connection protocols and collect and display the requested email on the user's browser anywhere in the world via the Internet.

Further functionality may be provided to users by presenting them with the option of storing their encrypted username and/or password details on the computer they are using for ease of use. Alternatively, the user can type in these details each time they use the service.

In a further embodiment of this invention, the software is capable of retrieving messages on a WAP enabled device, such as a mobile phone or PDA. This is achieved via the same process described above, but the coding necessary to display the retrieved messages on WAP devices is WML as opposed to HTML. In fact, regardless of the viewing device, be it a computer, phone, PDA or some other network-enabled device, the software is still able ascertain and retrieve a users POP3 email and display it on the user's viewing device of choice.

Message Retriever is equally capable of retrieving emails from a user's accounts whether set up on a POP3 server or other mail protocol server, such as IMAP. For present purposes POP3 has been used for exemplification purposes on account of its prevalence in the market place. The invention, however, is not to be considered as limited to such.

4. Content Channeling

A still further invention provided by the present application is the ability to dynamically generate site content at one website ("beneficiary site") that is "transmogrified" from another website ("originating site"). For example, selected content that is frequently updated on the originating site, such as a Top 10 list, could be periodically channeled to the beneficiary site, such as when it is updated on the originating site. Naturally, such action would be subject to copyright considerations. Further, the content could be presented on the beneficiary site in a different font, style, color, format, juxtaposition, etc. Accordingly, the software according to this invention is able to display the content on the beneficiary site according to the stylistic preferences of the operator/owner of the beneficiary site.

This transmogrification is achieved by generating a sequence list of "address points" within a specific page of the originating site. In the first instance, the "address points" of the beneficiary site must be determined by analysing the structure of the originating site. The structures of originating sites vary depending upon the preferences of the web design teams that create the sites. Often, sites are created with an extremely organized and well-defined tabular structure, whereby content, be it text or images, are contained within specific tables, cells or form elements.

The software of the present invention is able to produce a unique and consistent series of address points within the originating site web page through the following process:

1. The originating site page is loaded into the software's memory;
2. The page is then scanned searching for table, table row, table data and/or form element HTML tags.
3. When table tags are found they are assigned a hierarchical address point based on the position within the page by the following method:
   each top level table is given a consecutive number, ie 1, 2, 3, etc
   each top level table is then scanned searching for tables within that table;
   each secondary table that is found is then given a unique address point based on the top level table number concatenated with the sequence number of the secondary table, for example, the third secondary table within the second top level table is given the address point 2.3;
   This address point generation process is repeated recursively until the entire page of the originating site has been scanned;
   Accordingly, at the completion of this process, a particular table might have an address point of 9.7.1 being the first third level table within the seventh second level table within the ninth top level table.
4. During the processing of the table tag address points the software will discover table row and table data element tags (if they are present) and assign each cell with an address point based on the table address point in which the cell resides combined with the sequence number of the table row and data elements. For example, the cell located in the third row and the second column of the first third level table within the seventh second level table within the ninth top level table would have an address point of 9.7.1.cell(3,2).
5. During the processing of the table tag address points the software will discover form element tags, such as input boxes/radio buttons/drop down lists/etc, (if they are present) and assign each form with an address point based on the table address point in which the form resides combined with the sequence number and the form element type. For example, the third radio button in the first third level table within the seventh second level table within the ninth top level table would have an address point of 9.7.1.radiobutton.3.

These address points are reasonably stable points of reference to a particular position within the page's structure, even though the content within page might be subject to frequent change.

Once address points are generated for the entire page, the page is displayed to the operator with visible address points located adjacent to the relevant tag. The operator then locates the address point within the page that corresponds to the target content. This address point is stored by the software for future reference as relating to the target content.

Additionally, the operator selects a start and an end point for the target content. These start and end points are typically the start and end of the relevant table, however in some cases the entire table is not desired and the start and end points may be, for example, key words or specific tags within the table. In which case, the operator can manually assign these start and end points into the system.

Once these elements are confirmed the software will store the web page address, the generated address point, and the starting and ending point markers relating to the content to be channeled into a database.

Once the operator has assigned an "address point" to a particular cell within the originating site the software is able to periodically query, capture, transmogrify and store the content associated with that address point into a file in another location for later inclusion into the beneficiary site.

This is achieved in the following sequence:
   on an ad hoc &/or predefined periodic basis (e.g. weekly) the software will open the database of web page addresses, address points and starting and end points;
   the originating web page is opened within the software;
   the address points are assigned to the relevant sections of the page;
   the page is scanned for the specific address point which refers to the content to be channeled;
   the page is then further scanned from that specific address point to locate the starting and end points;
   the area between the starting and end points is copied and stored in a file in another location;
   this file is then processed to insert/alter specific HTML tags which relate to the look and style of the beneficiary site;
   typically the beneficiary site would use a server side mechanism such as server side includes to insert the date into the beneficiary site.

The present invention is particularly useful in that it provides a means by which the webmaster of the beneficiary site need not manually update the content each time the content on the originating site changes. Hence, this software automates the process of monitoring the originating site and implementing the necessary changes from the originating site into the beneficiary site.

5. URL Translator

Presently, the URL address bar within internet browsers are only capable of accepting and displaying a subset of all ASCII characters, commonly known as US ASCII. US ASCII contains Roman alphabet characters, e.g. abcdefg, Arabic numbers, e.g. 1234567 and a limited set of punctuation, such as periods, semi-colons, dashes, forward slashes, etc. This is a naming protocol limitation that is inherent in the technical infrastructure of the Internet. It creates a discriminatory barrier to the non-English speaking communities of the world.

For instance, a universally popular means of surfing the Internet is to type in generic domain names in the URL address bar in the hope of finding a relevant site, e.g. www.computers.com. This is highlighted by the six and seven figure prices that have reportedly been paid for such generic domain names.

Unfortunately, the same logic does not apply to generic terms of other languages, particularly if the other language is not US ASCII based and therefore does not use the English alphabet, such as Chinese, Japanese, Thai, Hebrew, etc. If non-US ASCII characters are typed into a URL address bar the browser will return an error message to the user when it attempts to locate that site because the internet protocol requires all domain names to consist of US ASCII characters.

The present invention overcomes this obstacle by enabling users to enter non-US ASCII characters into their URL address bar and being directed to an appropriate site that relates to the term entered in their URL address bar. For present purposes, Chinese characters and Pinyin will be used for exemplification.

Once installed on a user's computer, the software of the present invention enables the user to enter a native language term into their URL address bar in their language and character set of choice, such as Chinese.

When the user hits enter or clicks to proceed to the site the present invention "intercepts" the non-internet compliant URL (ie non-US ASCII format) and redirects the browser to the appropriate site without raising any errors to the user.

For the purpose of certainty the present invention can achieve its goal via two methods. The first method involves the following process:

software associated with the present invention is installed on the user's computer;

the software establishes a "hook" into the "navigation procedures" of the user's browser, regardless of browser brand and version. By way of background, the "navigation procedures" of most browsers comprise a set of procedures and functions that direct and notify the browser software of the current browser status, where the user has been and where the user wants to go (by virtue of the user's URL address bar input), etc. These functions and procedures may be "exposed" through an Application Programming Interface (API) such as the Windows API, and may therefore be scrutinized, monitored and intercepted in real time to achieve additional functionality beyond the original intent of the original browser design;

when the user types in a non-US ASCII term into the URL address bar ("the Non-Compliant Term"), the browser software's navigation procedures automatically convert the Non-Compliant Term into an error message which contains the Non-Compliant Term, but in an internet compliant format ("Converted Term");

before the error message is displayed to the user, the software "intercepts" the message, reads it, analyses the content and locates the Converted Term;

the software queries a database of converted terms and corresponding websites to find a match for the Converted Term contained in the intercepted error message;

If a match is found then the user is redirected to the website that corresponds to the matched Converted Term;

the corresponding website is displayed to the user in lieu of the intercepted error message.

The second method involves a similar process but with subtle yet important differences:

the internet browser installed on the user's computer is configured so as to raise a specific website ("the Reference Site") when the "site not found" error is generated (this is commonly known as auto search functionality within MS Internet Explorer);

when the user types in a non-US ASCII term into the URL address bar ("the Non-Compliant Term"), the browser's auto search function calls the Reference Site with parameters which include the Non-Compliant Term, but in an internet compliant format ("Converted Term");

the Reference Site software automatically queries a database of converted terms and corresponding websites to find a match for the Converted Term;

If a match is found then the user is redirected to the website that corresponds to the matched Converted Term;

the corresponding website is displayed to the user in lieu of any error message;

Under this method, it is not necessary for software to be running in the background, as Aid the user's browser is configured to send the user to the Reference Site that has access to the relevant database.

Variations of and additions to the inventions described herein are possible within the general inventive concepts as will be apparent to those skilled in the art.

What is claimed is:

1. A computer program product storing executable instructions on a tangible, non-transitory medium, said instructions executed by a network-connected computer device, to execute a routine comprising:

detecting operations on the computer by a user on an online site viewed by the user, said computer detecting operations indicating that the user may potentially purchase products or services from the online site viewed by the user, by recognizing when the user accesses detailed information on the computer regarding a first product, wherein the first product is a product offered by a first trader operating the online site currently viewed by the user, and where a competing product to said first product is also offered by a second trader associated with the computer program;

comparing electronic information that electronically represents a specific page of the online site viewed by the user when viewing the first product, with a first index of keywords relating to a plurality of subject matter categories, where said electronic information is part of the online site being viewed by the user, but is less than an entirety of the online site viewed by the user, and is obtained from the part of the online site being viewed by the user, said comparing operating to determine first subject matter categories within said first index which match to said electronic information and where said subject matter categories define a category of the online site that describes the product or service;

cross-referencing said first subject matter categories determined by said determining, with a second index of alternative online sites, where said second index of alternative online sites is categorized by subject matter, said cross referencing determining alternative online sites that have a similar category to said first determined subject matter, said alternative online sites including a second site associated with the second trader associated with the computer program; and first displaying, in a first area on the user's computer monitor, said alternative online sites to the user, including the second site associated with the second trader associated with the computer program;

second displaying, in the first area on the user's computer monitor, a hyperlink to a specific page of the second site associated with the second trader associated with the computer program, wherein the specific page specifically relates to said competing product offered by the second trader;

(c) displaying in said first area on the user's computer monitor, a price of the competing product provided by the second trader; and (d) in the first area on the user's computer monitor, displaying information that enables placing an order for the competing product provided by the second trader.

2. The computer program product on a network-connected device of claim 1 wherein the first and second indexes are contained in a database remote from the computer program product.

3. The computer program product on a network-connected device of claim 1 wherein said routine further comprises:
   determining a geographic locality of the user; and
   where said alternative sites are in the same or a proximate geographical locality of the user, so that the displaying means displays any of the determined alternative sites in the same or a similar subject matter category, that are also in the same or a proximate geographical locality.

4. The computer program product on a network-connected device of claim 1, wherein said comparing uses information indicative of a title or address of the page that does not represent the actual information that is on the page.

5. A method of comparative advertising in an online environment including the steps of:
   receiving in a server computer, over a computer network coupled to online sites, information regarding at least one online site that has been viewed by a user connected to the computer network;
   analyzing electronic information that electronically represents a specific page of the at least one online site viewed by a user to identify subject matter represented by the at least one online site where said electronic information is part of the online site being viewed by the user, but is less than an entirety of the online site viewed by the user, and is obtained from the part of the online site being viewed by the user, said comparing operating to determine first determined subject matter categories;
   said analyzing including detecting operations on the computer by a user on an online site viewed by the user, said computer detecting operations indicating that the user may potentially purchase products or services from the online site viewed by the user, where the detecting operations includes recognizing when the user accesses detailed information regarding a competing first product, wherein the competing first product is one offered by a trader operating the online site currently viewed by the user and where a competing product to said first product is also offered by a second trader;
   cross-referencing said first subject matter categories determined by said analyzing with a second index of alternative online sites, where said second index of alternative online sites is categorized by subject matter, said cross referencing determining alternative online sites that have a similar category to said first determined subject matter categories where said first subject matter categories define a category of the online site that describes the product or service, said alternative online sites including a second site associated with the second trader;
   first displaying in a first area on the user's computer monitor, said alternative online sites to the user, including the second site associated with the second trader;
   second displaying in said first area on the user's computer monitor, a hyperlink to a specific page of the second site associated with the second trader associated with the computer program, wherein the specific page specifically relates to a competing product provided by the second trader;
   displaying in said first area on the user's computer monitor, a price of the competing product provided by the second trader; and
   displaying in the first area on the user's computer monitor, the ability to place an order for the competing product provided by the second trader.

6. The method of claim 5 further comprising determining a geographical locality relating to the user and only displaying alternative sites in the same or a proximate geographical locality.

7. The method of claim 6 wherein the geographical locality relating to the user is determined by analysing the user's electronic address and/or the address of the online site viewed by the user.

8. The method of claim 5 wherein said analyzing is performed by using information indicative of a title or address of the page that does not represent the actual information that is on the page.

9. The method of claim 5 wherein the information displayed to the user includes hyperlinks to the alternative online site(s).

10. A computer system carrying out comparative advertising in an online environment, comprising:
    a network connection, receiving, over a computer network coupled to online sites, information regarding an online site viewed by a user;
    a computer which is programmed for first analyzing electronic information that electronically represents a specific page of the online site viewed by a user to identify products advertised on the site, where said electronic information is part of the online site being viewed by the user, but is less than an entirety of the online site viewed by the user, and is obtained from the part of the online site being viewed by the user, detecting operations on the computer being programmed to determine that a user will potentially purchase products or services from the online site viewed by the user, wherein the detecting comprises recognizing, from the information indicative of the specific page, when the user accesses detailed information on the computer regarding a first product, wherein the first product is a product offered by a first trader operating the online site currently viewed by the user, and where a competing product to said first product is also offered by a second trader associated with the computer program, said computer
    cross-referencing any determined subject matter categories with a second index of alternative online sites categorised by subject matter, in order to determine any alternative online sites in the same or similar category, where said subject matter categories define a category of the online site that describes the product or service, the alternative online sites including a second site associated with the second trader associated with the computer program;

said computer producing outputs for displaying in a first area on the user's computer monitor, said alternative online sites to the user, including the site associated with the alternative trader associated with the computer program and for displaying in the first area on the user's computer monitor, a hyperlink to a specific page of the site associated with the alternative trader associated with the computer program, wherein the specific page specifically relates to a competing product provided by the second trader and for displaying in the first area on the user's computer monitor, a price of the competing product provided by the second trader; and for displaying in the first area on the user's computer monitor, the ability to place an order for the competing product provided by the second trader.

11. The computer system of claim 10 wherein the analysis is performed by using information indicative of a title or address of the page that does not represent the actual information that is on the page.

12. The computer system of claim 10 wherein the information displayed to the user includes hyperlinks to the alternative online site(s).

13. The computer system of claim 10 wherein the displayed information includes a price of the competing product(s).

14. The computer system of claim 13 further including the steps of:
determining whether the competing product price is less than the price of the identified product on the online site viewed by the user, and
(i) if less, displaying the competing product price to the user; or
(ii) if not less, ascertaining a best price relating to the competing product and displaying the best price to the user or a value in-between.

15. A method implemented in a network-connected device including:
receiving, over a computer network coupled to online sites, information regarding an online site viewed by a user;
recognizing when a user will potentially purchase products or services from an online site viewed by the user, wherein the recognizing when a user will potentially purchase products or services from an online site viewed by the user includes recognizing a point at which the user accesses detailed information regarding a competing product, wherein the competing product is one offered by a trader operating the online site currently viewed by the user and an alternative trader associated with the computer program;

comparing a URL, title and/or content of an online site viewed by a user with a first index of keywords relating to a plurality of subject matter categories, to determine any subject matter categories to which the online site relates, where said electronic information is part of the online site being viewed by the user, but is less than an entirety of the online site viewed by the user, and is obtained from the part of the online site being viewed by the user;

cross-referencing any determined subject matter categories with a second index of alternative online sites categorised by subject matter, in order to determine any alternative online sites in the same or similar category which match to said electronic information and where said subject matter categories define a category of the online site that describes the product or service;

displaying in a separate window on the user's computer monitor, any determined alternative online sites to the user, including the site associated with the alternative trader associated with the computer program;

displaying in the separate window on the user's computer monitor, a hyperlink to a specific page of the site associated with the alternative trader associated with the computer program, wherein the specific page specifically relates to a competing product provided by the alternative trader;

displaying in the separate window on the user's computer monitor, a price of the competing product provided by the alternative trader; and displaying in the separate window on the user's computer monitor, the ability to place an order for the competing product provided by the alternative trader.

16. The method implemented in the network-connected device of claim 15, wherein the first and second indexes are contained in a database remote from the computer program product.

17. The method implemented in the network-connected device of claim 15, further including:
means for determining a geographic locality relating to the user; and means for determining any alternative sites in the same or a proximate geographical locality to that relating to the user, so that the displaying means displays any of the determined alternative sites in the same or a similar subject matter category, that are also in the same or a proximate geographical locality.

18. The method implemented in the network-connected device of claim 15, further including:
means for determining a geographic locality relating to the user; and means for determining any alternative sites in the same or a proximate geographical locality to that relating to the user, so that the displaying means displays any of the determined alternative sites in the same or a similar subject matter category, that are also in the same or a proximate geographical locality.

* * * * *